(12) United States Patent
Beldham et al.

(10) Patent No.: US 7,017,621 B2
(45) Date of Patent: *Mar. 28, 2006

(54) CONTAINER FILLING APPARATUS AND METHODS

(75) Inventors: Paul M. Beldham, Mission Viejo, CA (US); Donald W. Smeller, Mission Viejo, CA (US); Christopher W. Nesselroad, Dana Point, CA (US)

(73) Assignee: Knight, Inc., Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/064,238

(22) Filed: Feb. 22, 2005

(65) Prior Publication Data

US 2005/0150572 A1    Jul. 14, 2005

Related U.S. Application Data

(63) Continuation of application No. 10/390,099, filed on Mar. 17, 2003, now Pat. No. 6,883,560, which is a continuation of application No. 09/954,505, filed on Sep. 12, 2001, now Pat. No. 6,532,998, which is a continuation-in-part of application No. 09/659,931, filed on Sep. 12, 2001, now Pat. No. 6,363,977.

(51) Int. Cl.
*B65B 1/04*    (2006.01)

(52) U.S. Cl. .............. 141/18; 141/2; 141/100; 141/104; 141/9

(58) Field of Classification Search .......... 141/9, 141/100, 104, 105, 286, 67, 2, 18, 234–237, 141/244, 245; 222/547, 564, 630, 494; 251/5; 366/163.2; 239/318

See application file for complete search history.

(56) References Cited

U.S. PATENT DOCUMENTS

| | | | |
|---|---|---|---|
| 2,331,291 A | 10/1943 | Annin |
| 2,353,143 A | 7/1944 | Bryant |
| 2,360,873 A | 10/1944 | Grove |
| 2,622,620 A | 12/1952 | Annin |
| 3,333,601 A | 8/1967 | Lofgreen |
| 3,624,801 A | 11/1971 | Gannon |
| 3,651,991 A | 3/1972 | Ohlson et al. |
| 4,218,013 A | 8/1980 | Davison |
| 5,033,649 A | 7/1991 | Copeland |
| 5,129,434 A | 7/1992 | Whigham et al. |
| 5,507,436 A | 4/1996 | Ruttenberg |
| 5,584,327 A | 12/1996 | Thomas et al. |

(Continued)

OTHER PUBLICATIONS

Jan. 1998, Knight, Inc., p. 2 of P/N 0900501, Rev. A and p. 2 of P/N 0900501, Rev. D.

*Primary Examiner*—Steven O. Douglas
(74) *Attorney, Agent, or Firm*—Stout, Uxa, Buyan & Mullins, LLP; Donald E. Stout

(57) ABSTRACT

A modular container filling apparatus includes a simple pilot valve which can be operated by a push button, a bottle-engaging yoke, or a manual valve at the distal end of a bucket filling hose. The modular construction of the apparatus allows a plurality of units to be mounted side by side on a modular water manifold by bayonet-type sealing connections. An anti-foam venturi and spout mixes chemicals with the water and minimizes foaming when filling a bottle. A plurality of chemicals can be selected by a rotational selector without intermixing.

4 Claims, 15 Drawing Sheets

U.S. PATENT DOCUMENTS

| | | |
|---|---|---|
| 5,682,930 A | 11/1997 | Crossdale |
| 5,832,972 A | 11/1998 | Thomas et al. |
| 5,902,041 A | 5/1999 | Parson et al. |
| 5,944,074 A | 8/1999 | Leahy et al. |
| 5,979,705 A | 11/1999 | Kaehler et al. |
| 6,532,998 B1 | 3/2003 | Beldham et al. |

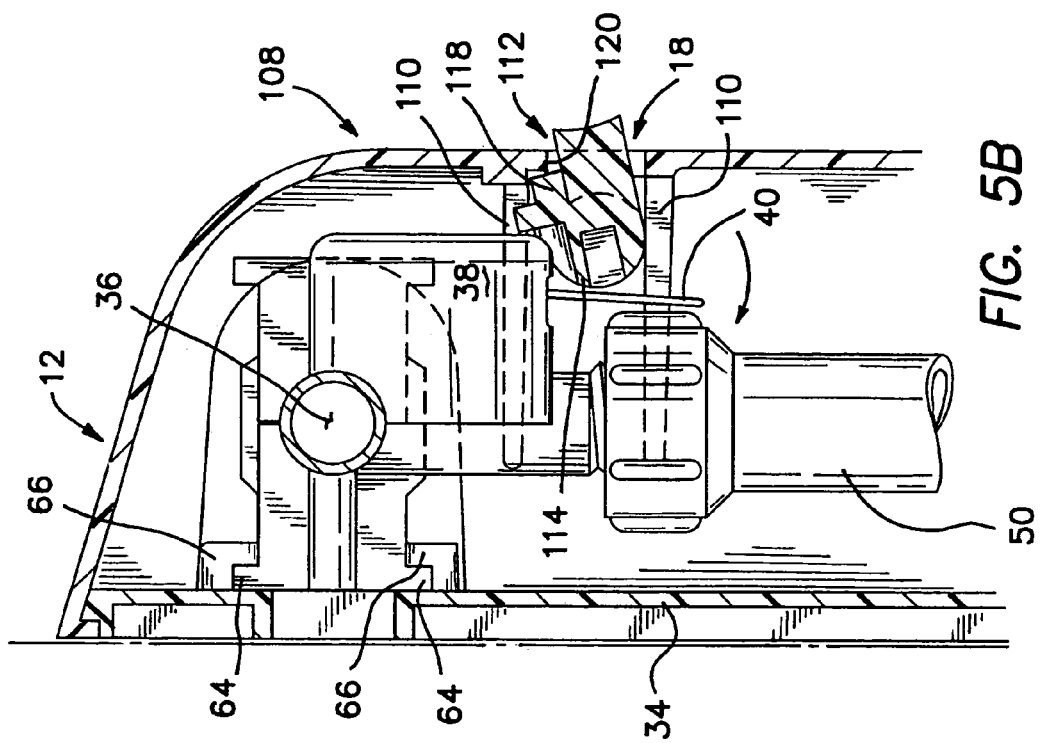
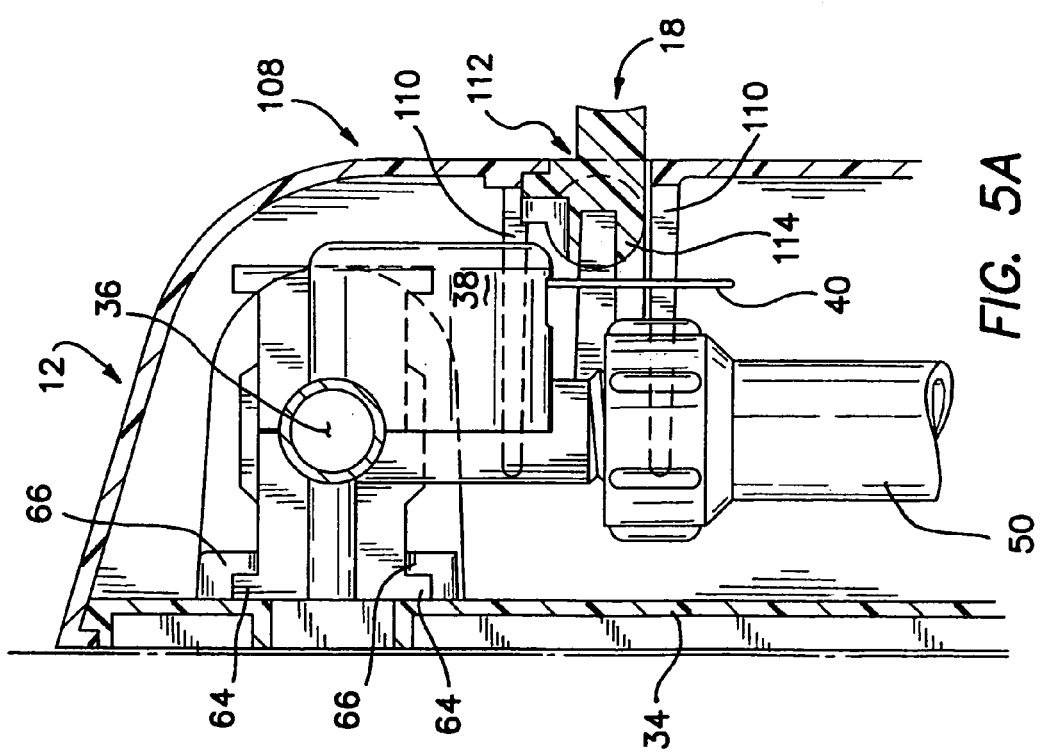

CONTAINER FILLING APPARATUS AND METHODS

This application is a continuation of application Ser. No. 10/390,099 filed on Mar. 17, 2003, entitled Container Filling Apparatus and Methods, now U.S. Pat. No. 6,883,560, which is a continuation of application Ser. No. 09/954,505 filed on Sep. 12, 2001, entitled Container Filling Apparatus and Methods, now U.S. Pat. No. 6,532,998, which is a continuation-in-part of application Ser. No. 09/659,931, entitled Container Filling Apparatus, filed on Sep. 12, 2000, and now U.S. Pat. No. 6,363,977. All of the foregoing patents are herein expressly incorporated by reference.

FIELD OF THE INVENTION

This invention relates to an apparatus for filling containers with a mixture of water and chemicals, and more particularly to such an apparatus that is simple, easily expandable, and modularly adaptable to a variety of operating modes.

BACKGROUND OF THE INVENTION

Container filling devices are in extensive use in many applications. For example, stringent health regulations in the hotel and restaurant industry often make it necessary, on a daily basis, to fill a large number of spray bottles, mop buckets, and other containers with various types of disinfectant and cleaning solutions. For this purpose, it is customary to provide, in a convenient location, a set of filling devices which, upon actuation of appropriate controls, dispense a stream of water mixed in a built-in venturi with one or more chemicals.

Conventional filling devices of this type have one or more drawbacks in practical use. For example, the water stream is customarily turned on and off by a bulky magnetically toggled pilot valve. Adjacent daisy-chained devices connected by screw-threaded fittings may not be connectable tightly enough to avoid leaks. One-handed operation of the device may be awkward, as may be the filling of a bucket several yards away from the device.

Additionally, if air is allowed to be entrained with the water/chemical stream discharged into the container, many cleaning solutions and other mixtures tend to foam quite strongly. As a result, foam overflows the container even if the container is nowhere near filled with liquid. Consequently, much time is wasted because either the container must be filled unnecessarily often, or the operator must fill the container very slowly.

Another related problem arises from the fact that the venturi devices require an air gap, i.e. a device which breaks any accidental siphon, so as to prevent water in the venturi from flowing back into the public water supply. In practice, the filling apparatus is typically mounted on a wall. Most conventional air gap devices of the type useful in such filling apparatus have a tendency, albeit small, to spit and splash spray water outwardly of the air gap device. This spray, and the resulting drip, is annoying and, over a period of time, tends to damage the wall and make the apparatus unsanitary.

Prior to the present invention, water public safety authorities would only approve for this purpose a completely open air gap device which would cause the above-described foaming, spitting and splashing. With the use of the present invention, applicants have been successful in obtaining local and national water authority approvals for anti-foaming splash proof venturis throughout the United States and many parts of the world.

It is therefore desirable to provide a simple, versatile filling device that can be modularly altered to suit a variety of operating locations and modes, and which can be easily operated from the distal end of a hose at a substantial distance from the device. Additionally, it is desirable to provide an improved device which is simple in construction and operation, but minimizes foaming during mixing of the water/chemical stream.

SUMMARY OF THE INVENTION

The present invention overcomes the shortcomings of the prior art by providing, in one aspect of the invention, a small, simple pilot valve arrangement that lends itself to actuation by a small movement of a control on the device or remotely from it. In another aspect of the invention, daisy-chaining of the inventive devices is accomplished by a bayonet arrangement which is highly versatile and is easily kept fluid-tight without requiring close tolerances in positioning the daisy-chained devices. In a third aspect of the invention, the device is so modularly constructed as to be interchangeably operable by various types of controls without changing the control mechanism itself.

In another aspect of the invention, there is provided an anti-foam splash-proof nozzle for filling containers, which comprises an air gap section. The air gap section comprises a hollow barrel having a water inlet and lateral openings, and an elastic sleeve surrounding the barrel and forming therewith a resiliently openable seal. The sleeve, when the seal is opened, defines a water path between the barrel and the sleeve which is directed into the plenum, while at the same time sealing the plenum against ambient air. Additionally, the nozzle comprises a venturi section. The venturi section comprises a venturi, a water inlet from the plenum to the venturi, and a passage for conveying a foam-prone chemical into the throat of the venturi to mix it with water flowing through the venturi. An outlet is adapted to communicate with a container to be filled. The venturi section is comprised of integrally molded plastic. A plenum is disposed between the air gap section and the plenum section, wherein the plenum is in communication with ambient air in the absence of water flow.

The invention, together with additional features and advantages thereof, may best be understood by reference to the following description taken in conjunction with the accompanying illustrative drawing.

BRIEF DESCRIPTION OF THE DRAWING

FIG. 5a is a fragmentary vertical cross-section of the remote-controlled unit of FIGS. 1 and 2 showing the valve control in the closed position;

FIG. 5b is a cross-section similar to FIG. 5a, but showing the valve control in the closed position;

DESCRIPTION OF THE PREFERRED EMBODIMENT

Figure 2:
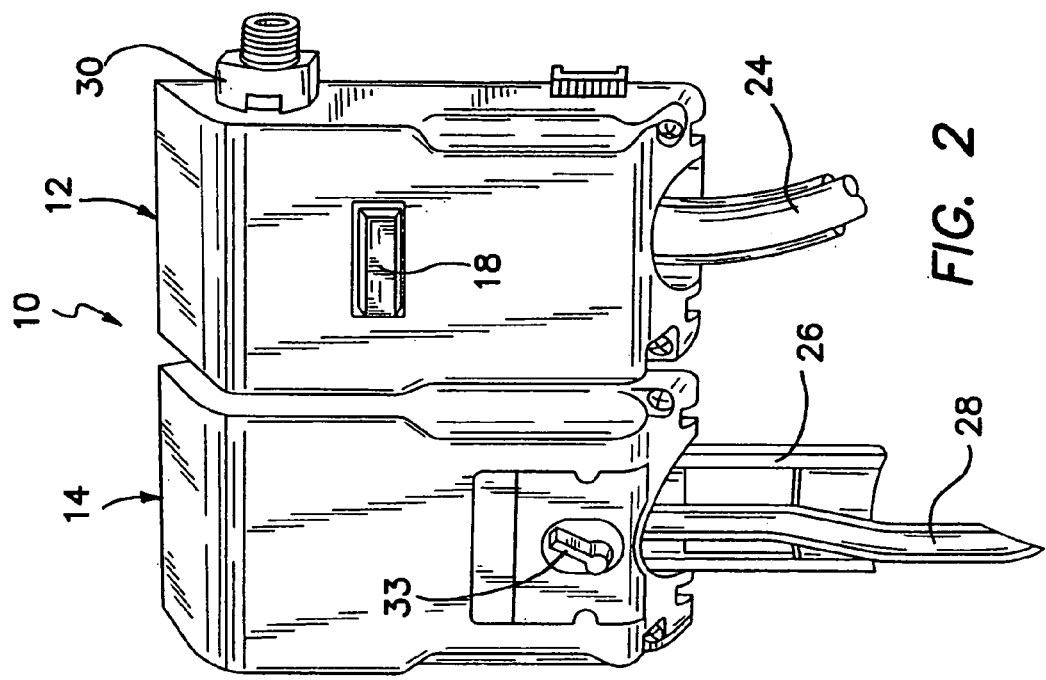
FIG. 2 is a perspective view of a first embodiment of the invention.
Figure 1:
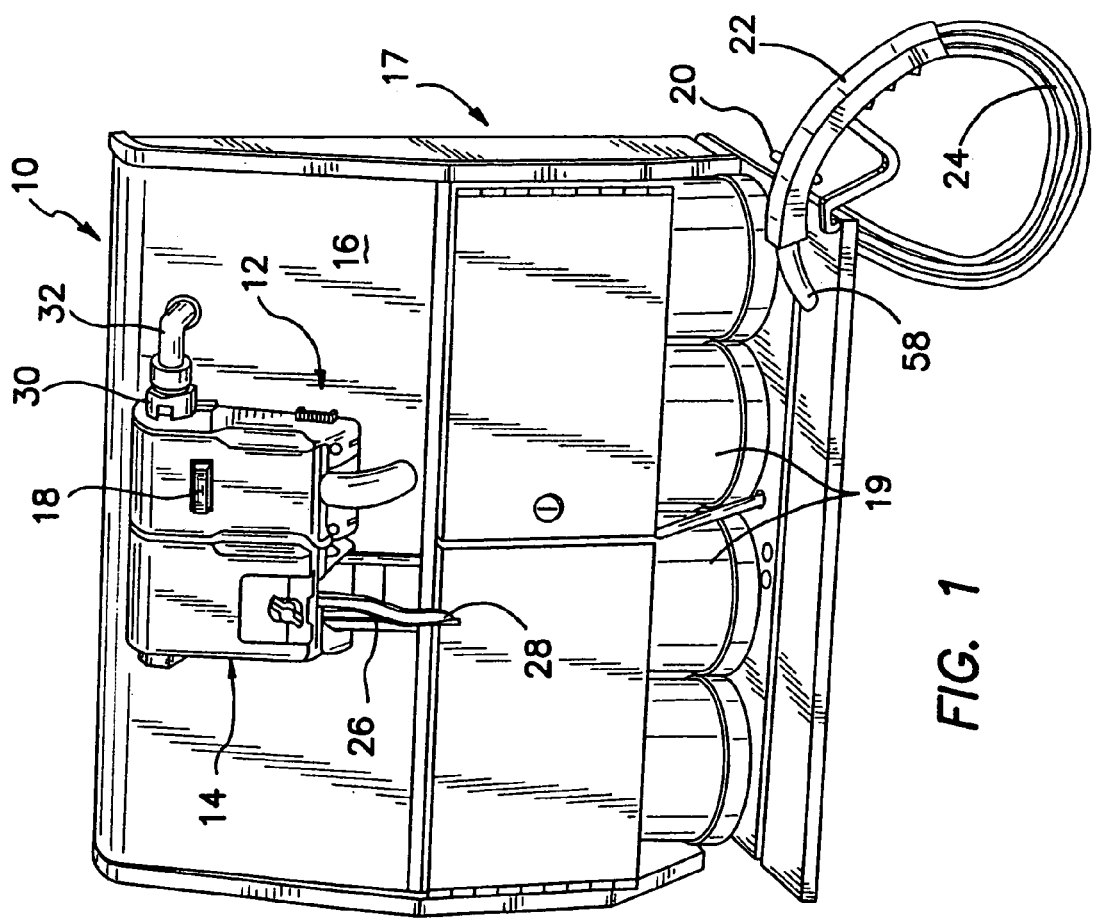
FIG. 1 is an overall perspective view of an apparatus embodying the invention.

FIGS. 1 and 2 shown an overall view of an apparatus 10 containing two preferred embodiments of the invention. One of these, device 12, may be used, for example, to fill a bucket, while the other of these, device 14, might be used to fill a bottle. The apparatus 10 may be mounted on a wall 16 (FIG. 1) which may be the front panel of a chemicals cabinet 17 containing jugs 19 of appropriate chemicals. The bucket filler 12 may be operated in one of two ways: either by actuation of a button 18 or by actuation of a mechanism 20 associated with a grip 22 mounted at the distal end of a three-lumen hose 24 extending from the device 12. The bottle filler 14 is preferably operated by a yoke 26 (better seen in FIGS. 2 and 13), which is depressed by a bottle when its neck is slipped over the spout 28. As best seen in FIG. 2, a chemicals selector 33, illustrated in detail in FIG. 15, may be provided, e.g. on unit 14, to permit different chemical solutions to be dispensed. The devices 12 and 14 are preferably daisy-chained along a water manifold 30 connected to a public water supply 32. The functioning and interrelationship of these components is described in more detail below.

Figure 3:
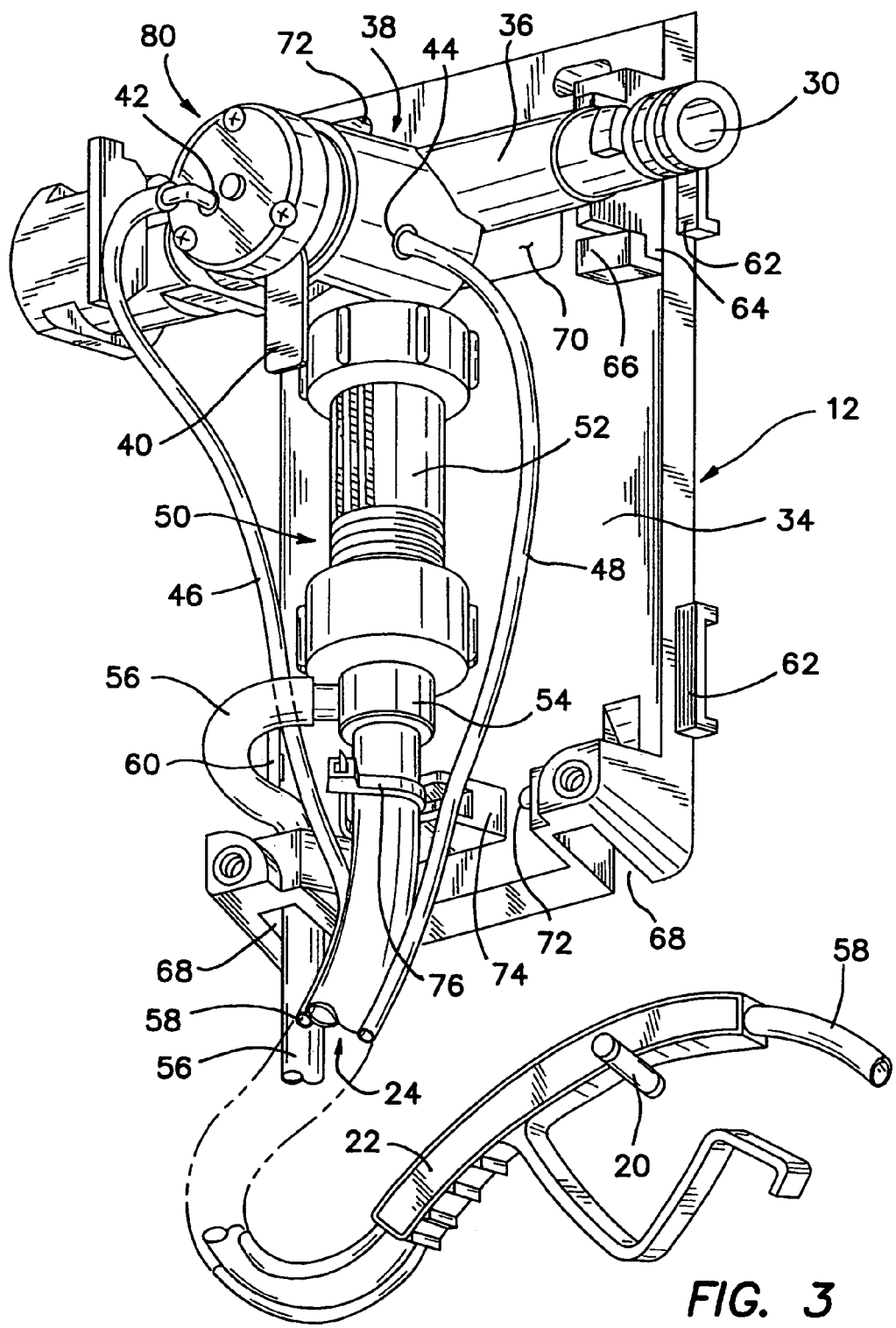
FIG. 3 is a perspective view of the remote-controlled unit shown in FIGS. 1 and 2, with its cover removed for illustrative purposes.
Figure 13:
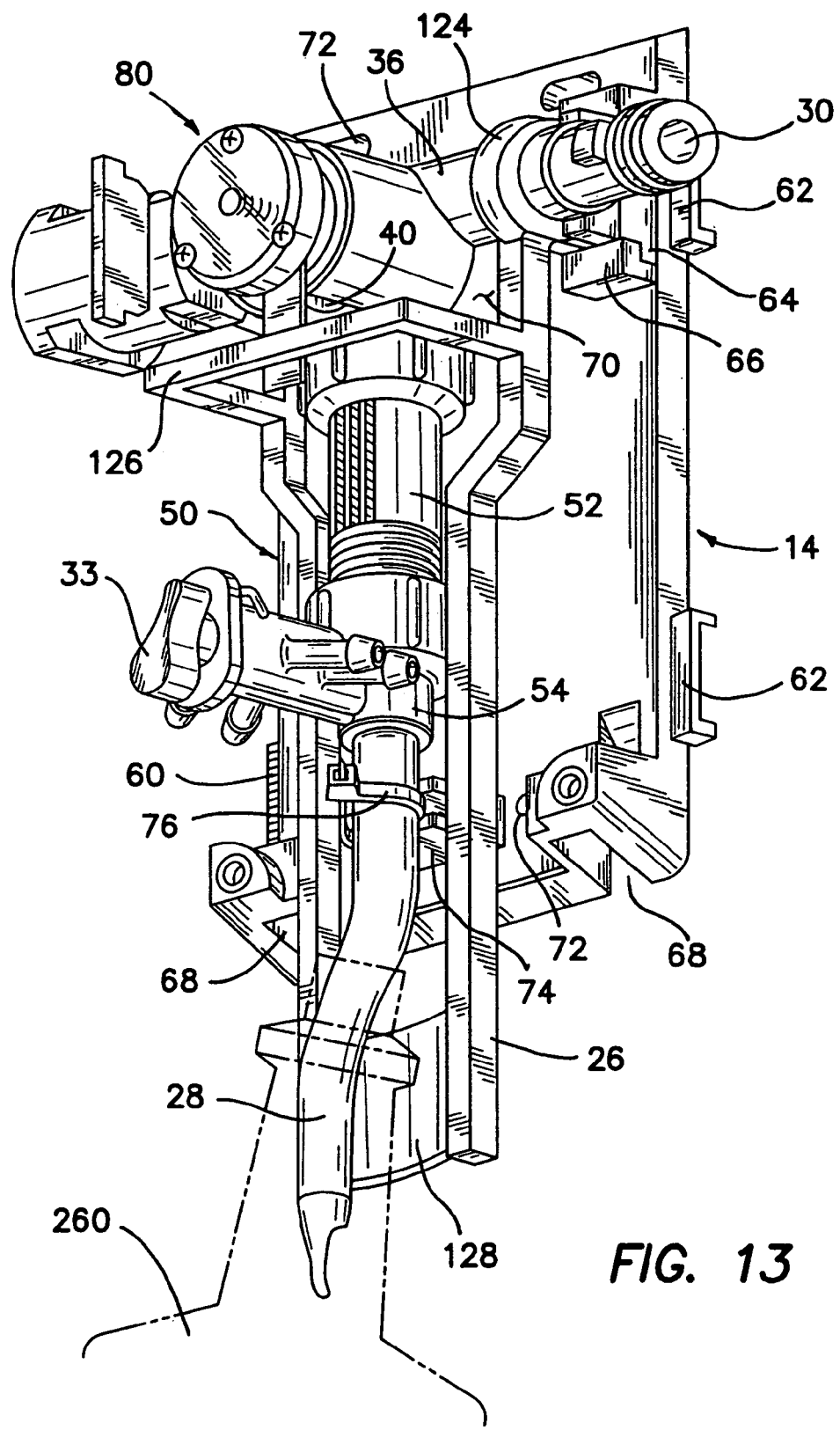
FIG. 13 is a perspective view of the bottle filler unit of FIGS. 1 and 2 with the cover removed.

FIG. 3 shows the fundamental elements of the inventive apparatus as used in device 12, and FIG. 13 shows the same as used in device 14. A mounting plate 34 supports a section 36 of the water manifold 30. A pilot valve 38 is integrally formed with the manifold section 36. The valve 38 is operated, in a manner described in more detail below, by an actuating lever 40 or through fittings 42, 44, which are connected, respectively, to the two smaller lumens 46, 48 of the three-lumen hose 24.

When the valve 38 is open, water flows from the valve 38 into a backflow preventer and mixer combination 50 consisting of an air gap or flex-gap 52 and a venturi 54. The venturi draws a chemical from the chemical feed line 56 and mixes it with the water. The construction and functioning of the anti-foam, anti-spray mixer combination 50 is discussed in greater detail hereinbelow, in connection with FIGS. 19–22. The outlet of the venturi 54 is connected either to the main lumen 58 of the hose 24 (in device 12, FIG. 3), or to a spout 28 (in device 14, FIG. 13).

The mounting or base plate 34 has a pair of male tabs 60 (only one being visible in FIGS. 3 and 13) on one side and a matching pair of female tabs 62 on the other. The tabs 60, 62 (best seen in FIGS. 7 and 8) allow a plurality of devices 12 and/or 14 to be daisy-chained side by side with the right spacing between them for correct engagement of their manifold sections 36 as described in more detail below. The manifold section 36 is held on the base plate 34 by a set of tabs 64 (best seen in FIGS. 5a and 5b) that slidingly engage the hooks 66 formed on the base plate 34. Line channels 68 are provided in the base plate 34 to accommodate chemical feed lines such as 56 entering the device 12 or 14 from a location outside the device.

Figure 10:
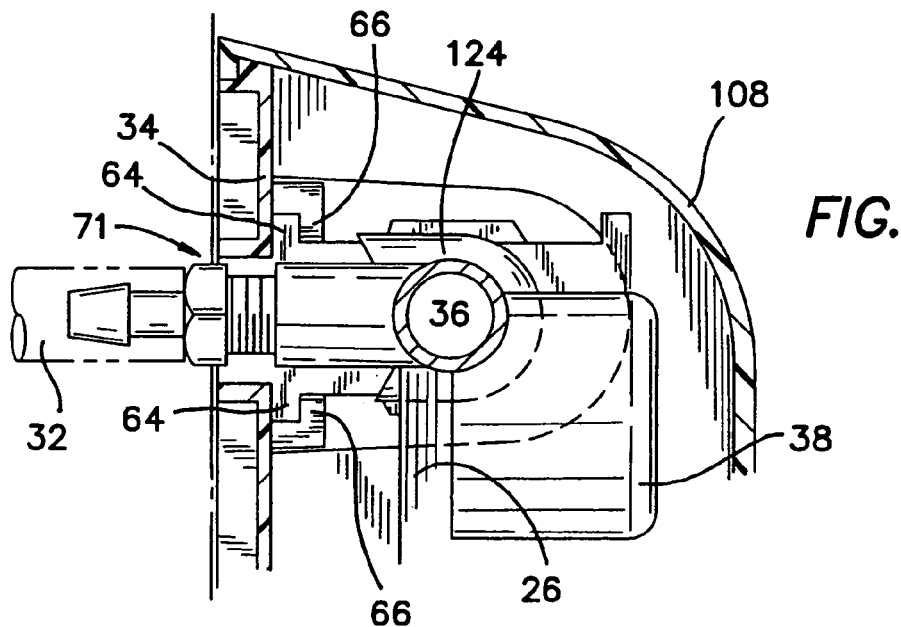
FIG. 10 is a vertical cross-section of an alternative embodiment of the valve assembly for a rear-mounted water supply.

An opening 70 is provided in the base plate 34 directly behind the water manifold section 36 to accommodate a possible water connection 71 (FIG. 10) through the base plate 34 for sections 36 that, as described below, receive water from the back rather than the side. The base plate 34 may be mounted on a support through the use of screw holes 72. A strap retainer 74 is provided in the base plate 34 to receive a strap 76 which holds the hose 24 (FIG. 3) or spout 28 (FIG. 13) against the base plate 34 and thereby prevents lateral movement of the device components on the base plate 34.

Figure 4A:
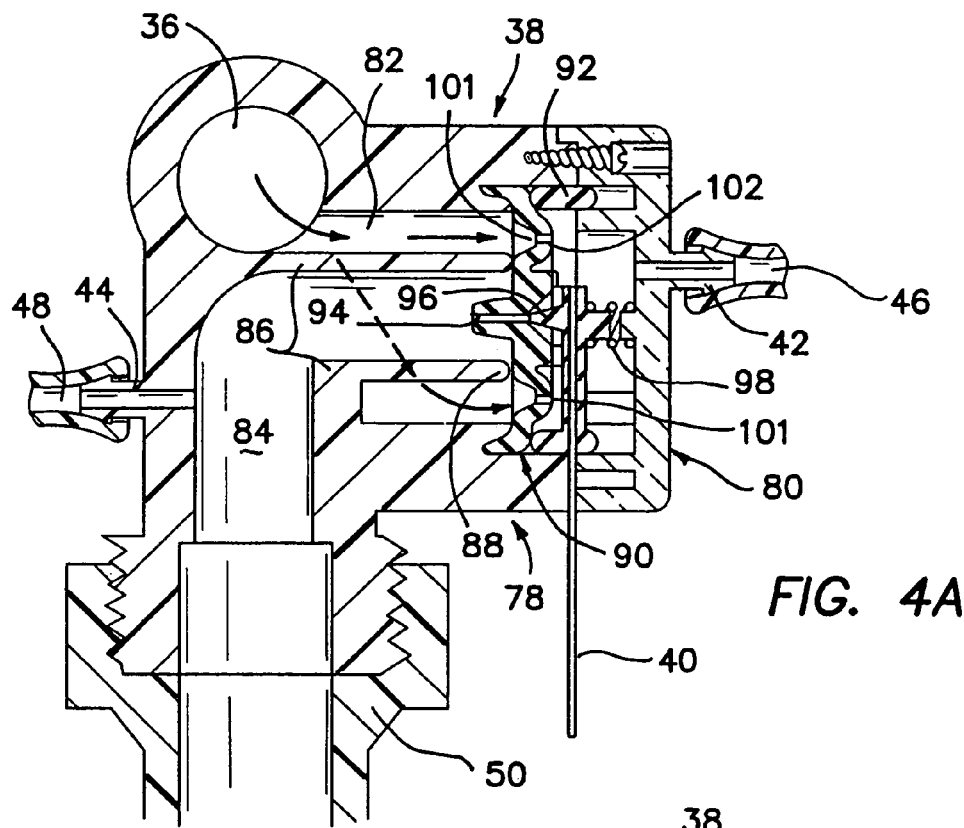
FIG. 4a is a vertical cross-section showing the water valve in its closed position.
Figure 4B:
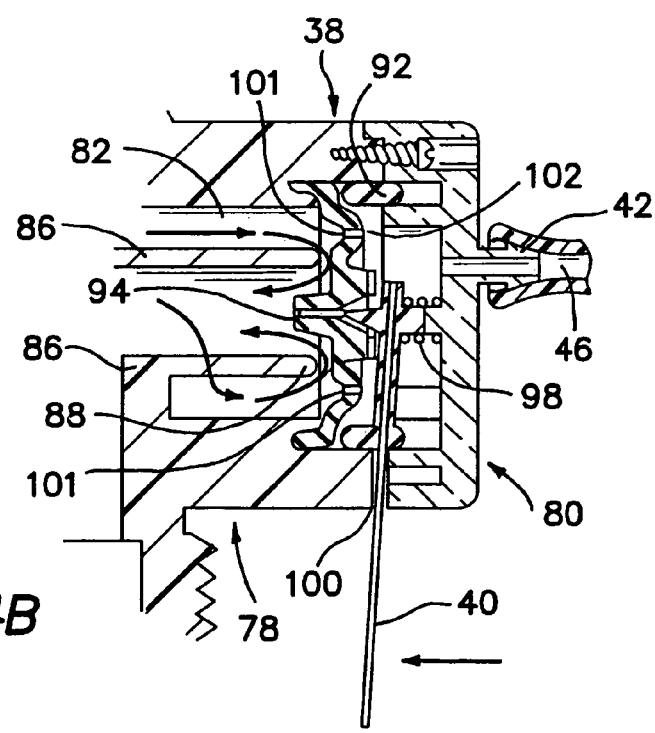
FIG. 4b is a detail cross-section similar to FIG. 4a, but showing the valve in its opened position.

FIGS. 4a and 4b show the operation of the pilot valve 38. The valve 38 includes a body 78 capped by a cap 80. The body 78 includes an annular inlet chamber 82 which communicates with the manifold section 36. An outlet chamber 84 is formed concentrically with the inlet chamber 82 on the inside thereof. The chambers 82, 84 are separated by an annular shoulder 86 which forms the main valve seat 88.

A resilient valve element 90 is sealingly held in the valve body 78 by a resilient annular ring 92 that clamps the periphery of the valve element 90 to the valve body 78 when the cap 80 is installed. The valve element 90 has a relatively large opening 94 centrally formed therein. The opening 94 is normally closed by a resilient plug 96 attached to the actuating lever 40. The plug 96 is biased into engagement with the valve element 90 by a spring 98 but can be disengaged by depressing the lever 40 so as to rock the lever-and-plug assembly about the pivot point 100 (FIG. 4b) formed on the valve body 78.

The valve element 90 also has a pair of very small holes 101 that allow the inlet chamber 82 to communicate with the ring chamber 102 formed by the resilient ring 92, the valve element 90 and the cap 80. When the plug 96 is engaged with the valve element 90, the pressure of the public water supply is present in the ring chamber 102 and presses the valve element 90 firmly against the seat 88. When the lever 40 is no actuated to disengage the plug 96, the relative size of the openings 94 and 101 in the valve element 90 cause the pressure in the ring chamber 102 to drop to the ambient pressure of the outlet chamber 84. With the supply pressure in ring chamber 102 thus removed, the supply pressure in inlet chamber 82 can push the resilient valve element 90 off the valve seat 88 and open the valve 38.

It will thus be seen that the valve 38 is opened by equalizing the pressure in ring chamber 102 and outlet chamber 84, i.e. by establishing communication between them. For this reason, it is possible to also control valve 38 from the distal end of hose 24. For that purpose, lumen 46 of the hose 24 is connected to a fitting 42 on the cap 80 which communicates with the ring chamber 102. Lumen 48 of the hose 24 is connected to a fitting 44 that communicates with the outlet chamber 84. When the distal ends of lumens 46 and 48 are interconnected by any appropriate mechanism 20 (FIGS. 11 and 12) at the grip 22 (FIGS. 1 and 3) on the distal end of the hose 24, the valve 38 opens. Likewise, when the lumens 46, 48 are disconnected from each other, the valve 38 closes. Although in theory, the lumen 46 could be discharged into the main lumen 58 or even to atmosphere by the mechanism 20, thus dispensing with the return lumen 48, this is not practically feasible for health reasons. Without the return lumen 48, if the grip 22 is dropped into the bucket, a backflow condition in the water supply 30 would bypass the backflow preventer 52 and cause the water-chemical mixture in the bucket to be aspirated into the public water supply through lumen 46. By providing the return lumen 48, the remote control circuit of mechanism 20 is closed entirely upstream of the backflow preventer 52. Thus, a remote control is provided that is backflow safe and uses neither electricity (a problem in hazardous environments) nor mechanical cables (which are prone to malfunction).

In accordance with the invention, the actuating lever 40 can be actuated by a variety of interchangeable actuating mechanisms. For example, a button 18 can be provided as shown in FIGS. 5a and 5b. For that purpose, the cover 108 of the device 12 is provided with two pairs of rails 110 into which a button assembly 112 can be slipped. The button assembly 112 can pivot about the rounded end piece 113. The actuating lever 40 can be actuated by pushing the button 18 inwardly of the cover 108 along the rails 110 (FIG. 5b) so that the nose 116 engages and depresses the actuating lever 40. When the lever 40 has been actuated, the button 18 can be pushed upwardly to where the shoulder 118 of the button assembly 112 engages the inside of the cover 108 above the button opening 120. The button assembly 112 will be held in that position by the spring 98 (FIGS. 4a and 4b). Thus, the valve 38 can be held open until the button 18 is pushed downwardly and the shoulder 118 becomes disengaged from the cover 108.

Instead of the button 18, a yoke 26 (FIG. 13) can be provided in the device 14 to actuate the lever 40. The yoke 26 fits over the manifold section 30 by means of hooks 124 that allow the yoke 26 to pivot about the manifold section 30. A crossbar 126 on the yoke 26 extends over the actuating lever 40 and depresses it against the force of spring 98 (FIGS. 4a and 4b) when the yoke 26 is pivoted about the manifold section 30. A curved plate 128 joining the two sides of the yoke 26 at its bottom forms a surface that engages the wall of a bottle 130 and pivots the yoke 26 when the spout 28 is inserted into the neck of the bottle 130.

Figure 6:
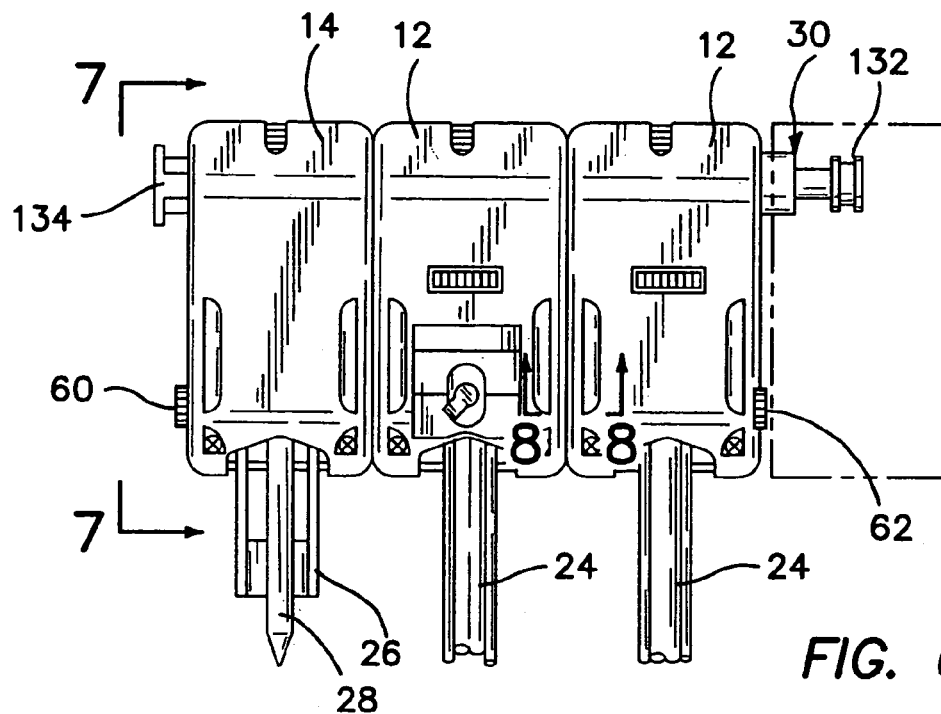
FIG. 6 is a front elevation illustrating the daisy-chaining of several units of the invention.
Figure 7:
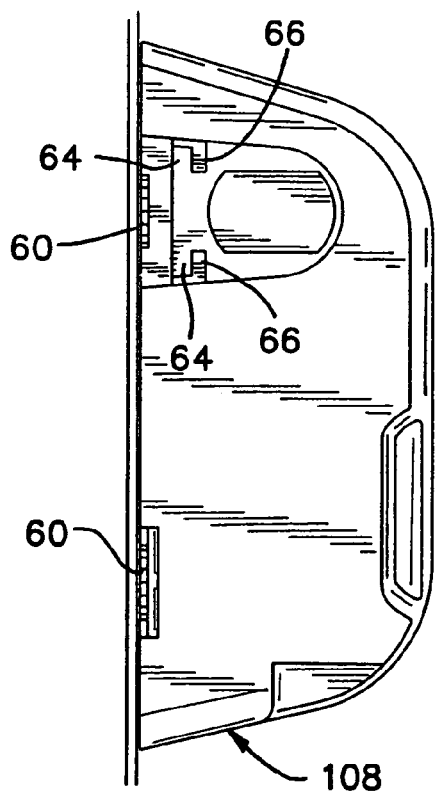
FIG. 7 is a side elevation of a unit showing the daisy chaining mechanism.
Figure 8:
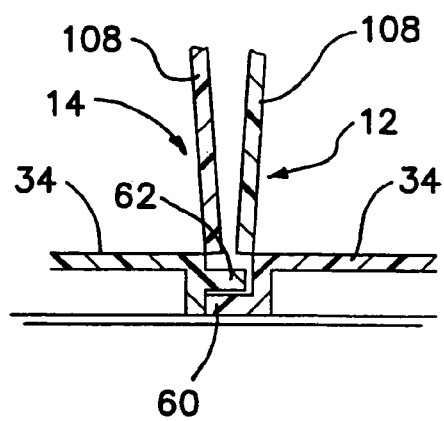
FIG. 8 is a detail cross-section along line 8—8 of FIG. 6.
Figure 9:
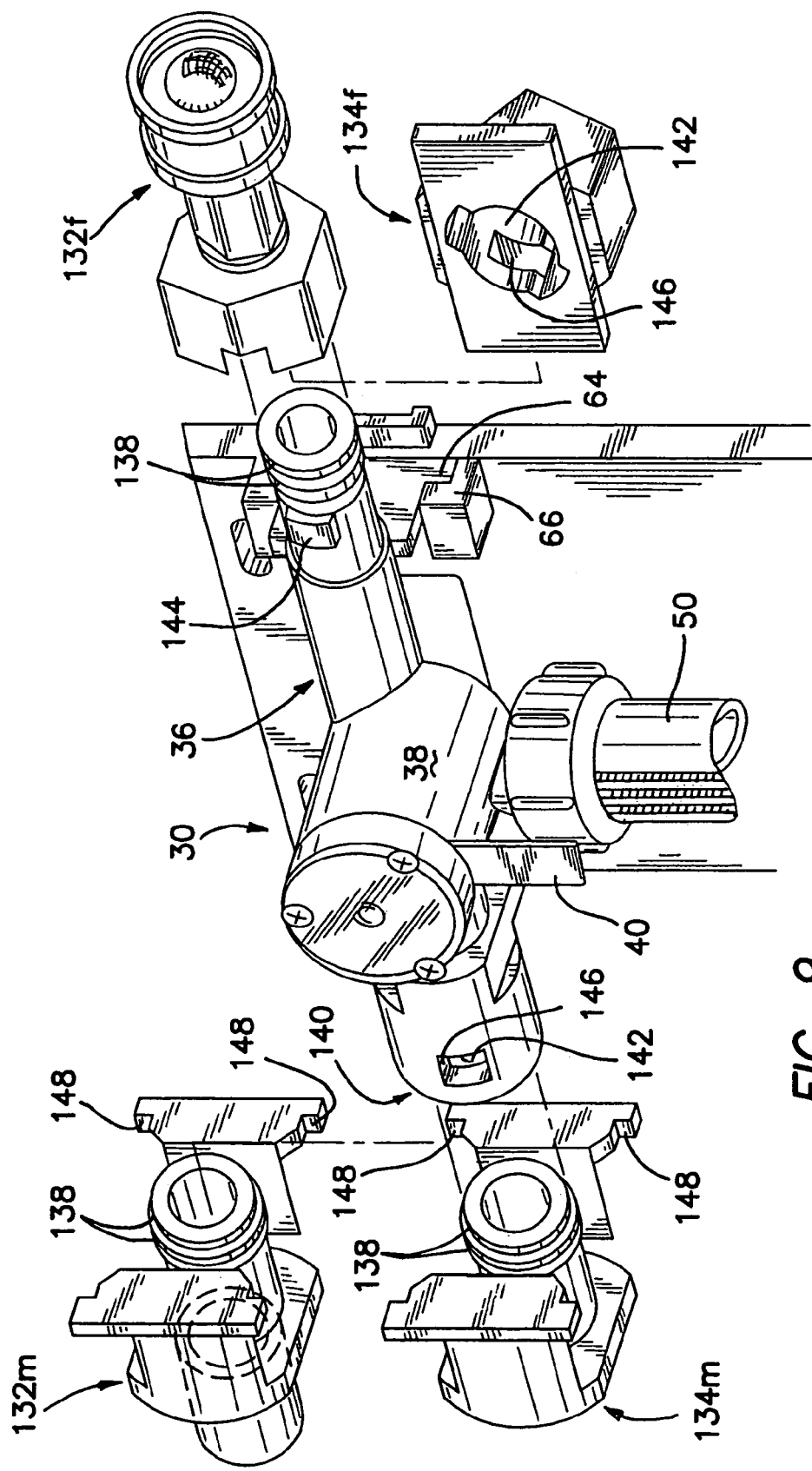
FIG. 9 is an exploded perspective view of a daisy-chained water line.

FIGS. 6–8 illustrate the modular daisy-chaining of various devices exemplified by devices 12 and 14 on a water manifold 30 having an inlet 132 and an end plug 134. The inlets 132 and end plug 134 may be male (suffix "m" in FIG. 9) or female (suffix "f" in FIG. 9) as needed. The exploded view of FIG. 9 illustrates the components of the water manifold 30 and shows some of the ways in which they can be modularly daisy-chained to accommodate a great variety of devices and plumbing layouts while remaining watertight even in the face of minor errors in device positioning. Each type of manifold section carries a pair of O-rings 138 on one end and a sleeve 140 with a matching smooth cylindrical inner surface 142 on the other.

The O-ring end is provided with a pair of annularly extending protuberances 144 that cooperate with slots 146 in the sleeve 140 of the adjacent manifold section to form a bayonet connection. The O-rings 138 engage the surface 142 of the adjacent manifold section to form a watertight seal that requires no sealing compound, washers, or accurate tightening of screw threads.

In order to daisy-chain several devices together, the daisy chain of manifold sections must first be constructed away from the base plates 34, and then be slid sideways under the hooks 66 of the base plates 34. Once the manifold sections 30 are engaged with the hooks 66, the bayonet connections are locked against disengagement by the interaction of tabs 148 with the hooks 66. As illustrated by fitting 134 in FIG. 9, the tabs 148 can be dispensed with if desired, because the flat surface 149 or 151, when it lies against the base plate 34 following assembly of the manifold, is sufficient to prevent rotation and disengagement of the bayonet connection.

The daisy chain of manifold sections 30 (or, for that matter, a single manifold section such as 36) may advantageously be terminated at one end by a water line fitting 132, and at the other end by a sealing closure fitting or end plug 134. Once installed on the base plate 34, the strap 76 (FIGS. 3 and 13) may be used to prevent any sideways movement of the device 12 or 14, thereby preventing the manifold section 36 from being slid out from under the hooks 66.

Figure 11:
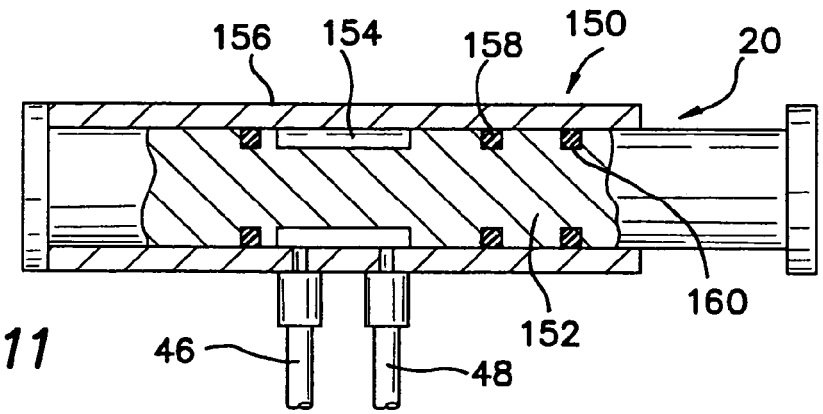
FIG. 11 is an elevation, partly in cross-section, showing the remote control in the open position.
Figure 12:
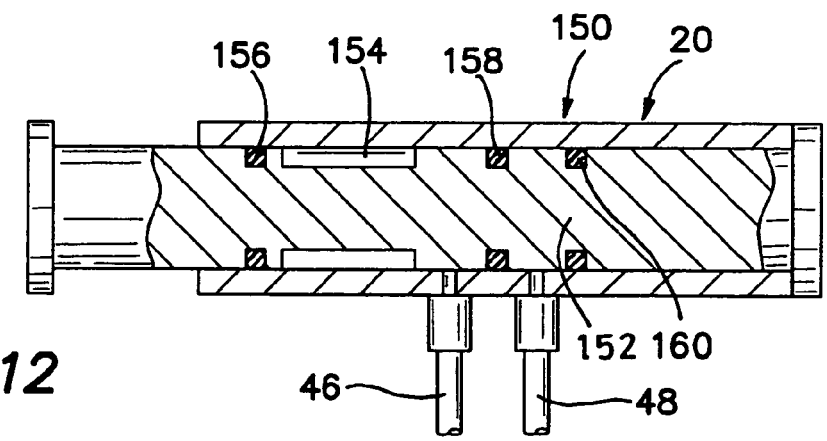
FIG. 12 is a view similar to FIG. 11, showing the control in the closed position.

FIGS. 11 and 12 show the remote control 20 on the grip 22 at the distal end of the hose 24. The control 20 has a sleeve 150 and a slidable piston 152. An annular groove 154 is provided between the left O-ring 156 and the center O-ring 158. In the position of FIG. 11, the groove 154 interconnects the lumens 46 and 48 so as to turn the water on as described above in connection with FIGS. 4a and 4b. In the position of FIG. 12, the lumens 46 and 48 are separated by O-ring 158 and are sealed from atmosphere by O-rings 156 and 160, thus turning the water off.

FIGS. 13–16 illustrate an alternative preferred embodiment of the invention using the anti-mixing chemical selector 33. The selector 33 includes a body 162 preferably integrally formed with the venturi 54. The body 162 defines a cylindrical chamber 164 which has at its inner end a passage 166 that forms the chemical input to the venturi 54. A plurality of chemical inlets 168a–d (four in the embodiment shown) extend generally radially from the chamber 164 in opposite directions.

Communication between a selected one of the chemical inlets 168a–d and the Venturi input passage 166 is established through a selector core 170 (FIG. 14) that carries a selector knob 172 and fits into the chamber 164. The core 170 has a central channel 174 that communicates at its inner end with the venturi input passage 166. Feeding into the central channel 174 are two lateral conduits 176, 178 disposed at right angles to each other (in the embodiment shown) and spaced from one another longitudinally of the core 170.

Figure 14:
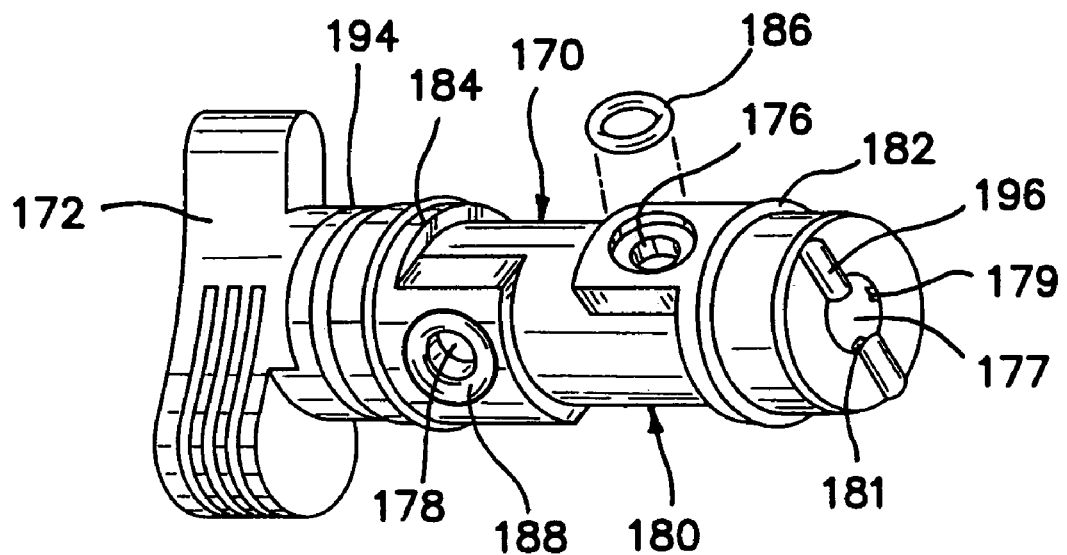
FIG. 14 is a perspective view of the handle and core of the chemical selector.
Figure 14A:
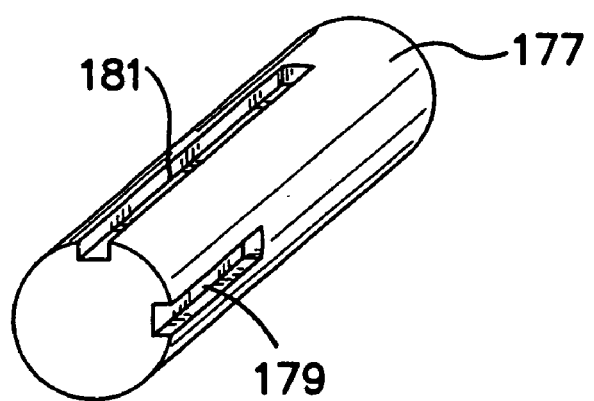
FIG. 14a is a perspective view of the volume-reducing insert for the selector core.
Figure 15A:
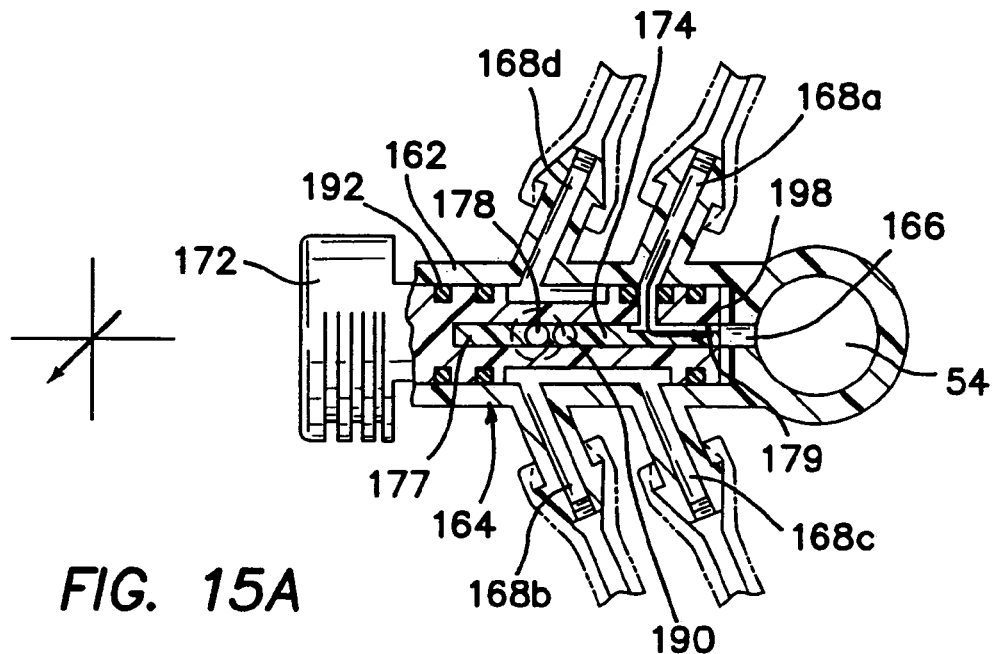
FIGS. 15a–d are axial cross-sections of the chemical selector in successive rotational positions of the core.
Figure 15B:
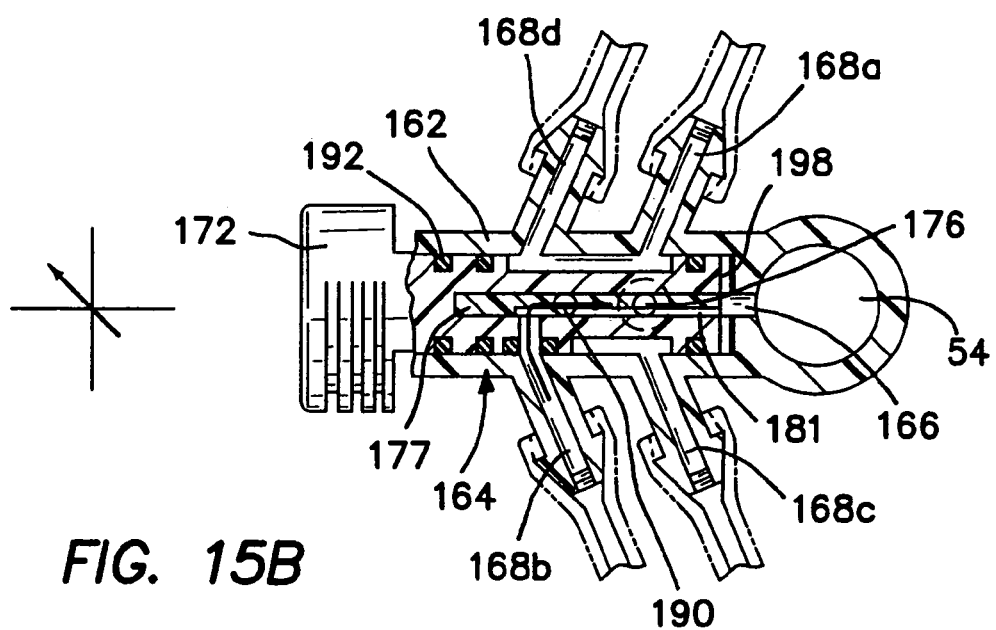
Figure 15C:
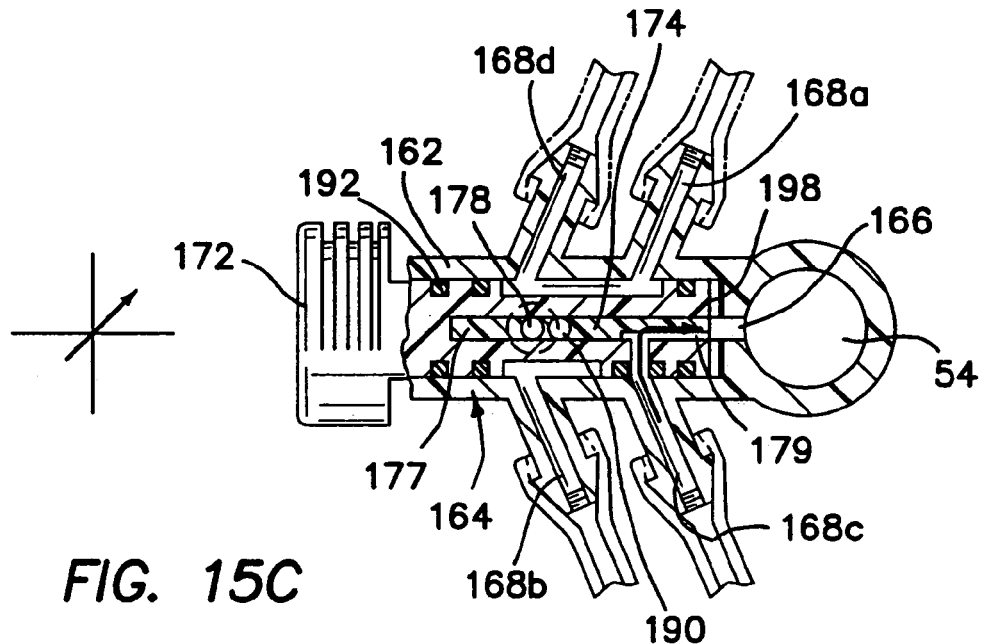
Figure 15D:
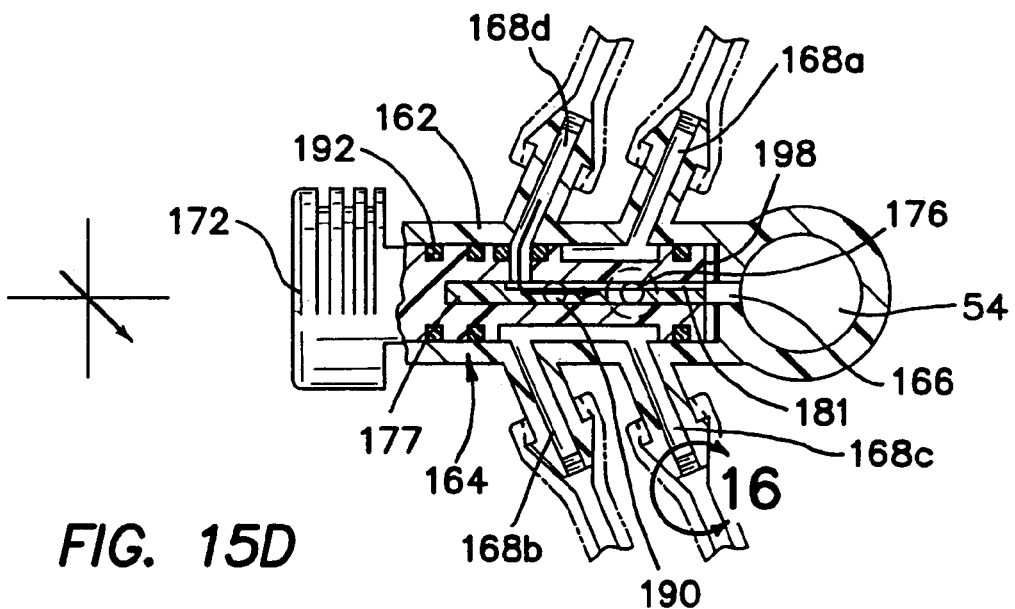
Figure 16:
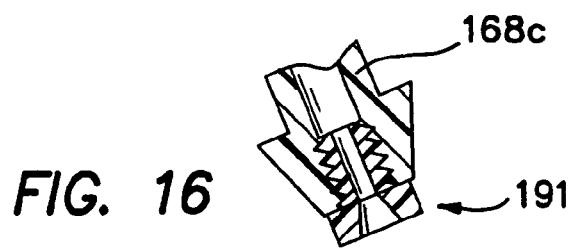
FIG. 16 is an axial cross-section of a flow restrictor used in conjunction with the chemical selector.

One potential problem with the chemical selector 33 is the fact that the central channel 174 of the core 170 has a volume (typically about 0.6 ml) in which some of the previous chemical is caught when the knob 172 is turned to switch to a new chemical. Molding constraints make it impractical to reduce the size of the channel 174. Therefore, to minimize this mixture of chemicals in the selector 33, a cylindrical insert 177 (FIG. 14*a*) may be provided in the channel 174. The insert 177 fills the channel 174, but allows chemicals to flow through grooves 179, 181 in its surface that are aligned with the conduits 176, 178, respectively. The flow rate of the chemicals used in the inventive device is very low (typically 1–2 ml/l $H_2O$), so that the small cross section of the grooves 179, 181 is sufficient to handle the maximum flow.

The middle portion 180 of the core 170, which includes the lateral conduits 176, 178, is sealed off from the venturi input passage 166 by O-ring 182, and from the knob 172 by O-ring 184. O-rings 186, 188 seal the lateral conduits 176, 178 against the walls of the chamber 164.

Except in the vicinity of lateral conduits 176, 178, the core 170 is recessed to a diameter smaller than the inner diameter of the chamber 164. Thus, when the selector knob 172 is turned to a position in which lateral conduit 176 communicates with supply passage 168*a* or 168*c*, or in which lateral conduit 178 communicates with chemical inlets 168*b* or 168*d*, the other three of the chemical inlets 168*a–d* are open to atmosphere through opening 190 in the body 162, and are isolated from the suction of the venturi 54, so that any chemicals present in the unused ones of chemical inlets 168*a–d* will not b drawn into the venturi 54.

The chemical inlets 168*a–d* are preferably internally threaded to enable them to sealingly receive flow reducers 191 (FIG. 16), plugs, or other elements (not shown) that may be desirable in a particular application.

The core 170 is retained in the body 162 by a resilient clip 192 that engages the groove 194 in the core 170. At its inner end, the core 170 carries a pair of protuberances 196 that are biased by the clip 192 into grooves 198 disposed at right angles to each other in the inner end wall of chamber 164. The protuberances 196 and grooves 198 thus cooperate to form detents that seat the selector mechanism correctly in the four positions (indicated by the arrows adjacent to FIGS. 15*a–d*) in which one of the two lateral passages 176 or 178 communicates with one of the four chemical inlets 168*a–d*.

Figure 17:
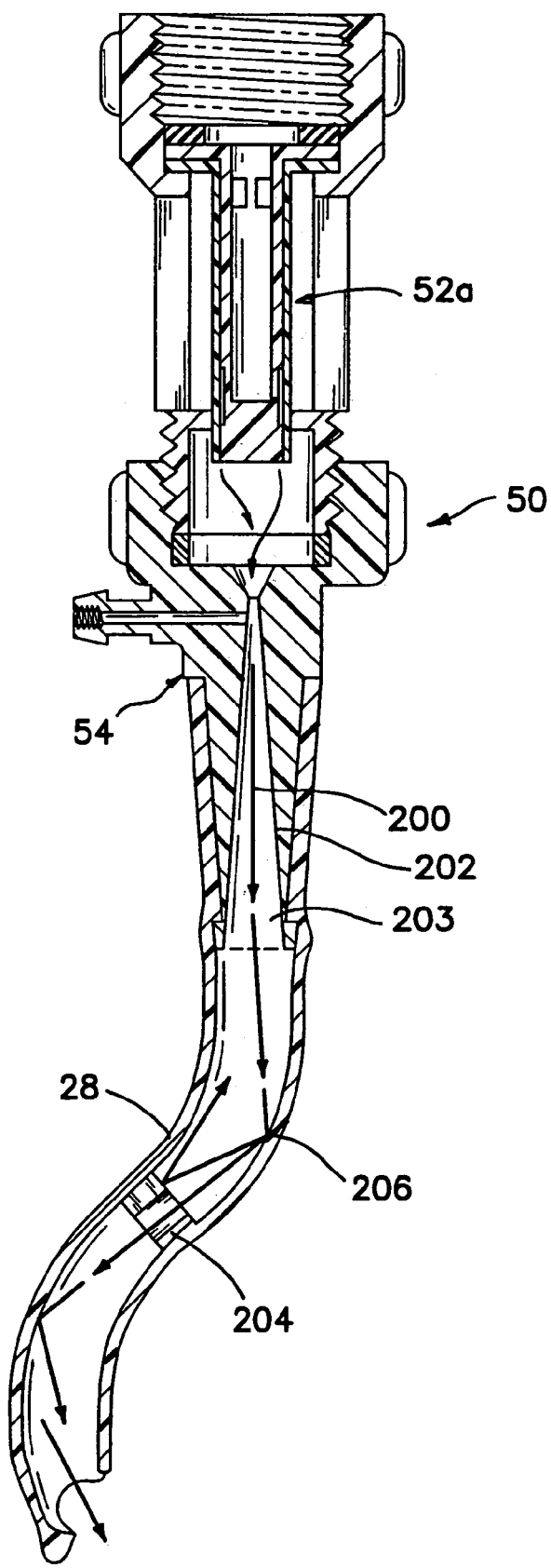
FIG. 17 is a vertical cross-section of one embodiment of the back flow preventer, venturi, and spout of FIG. 13.
Figure 17A:
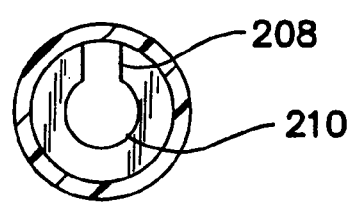
FIG. 17a is a cross-sectional view taken along line 17a–17a of FIG. 17.
Figure 18:
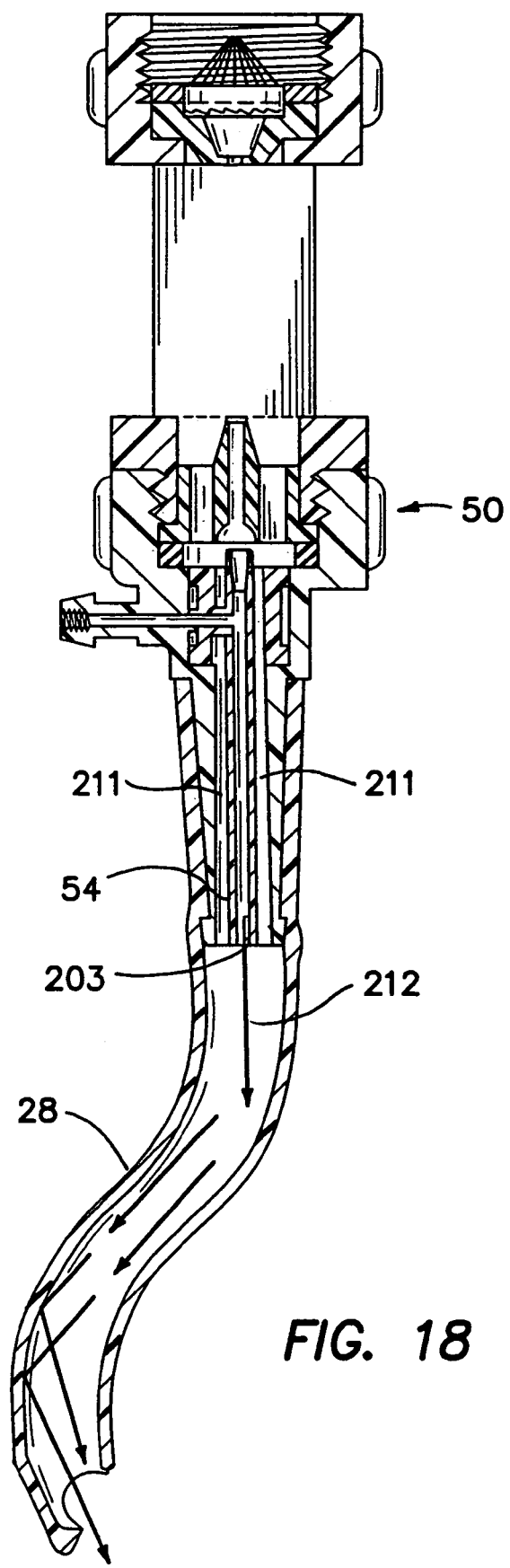
FIG. 18 is a vertical cross-section of another embodiment of the back flow preventer, venturi, and spout of FIG. 18.

FIGS. 17, 17*a* and 18 show venturi and spout constructions for two different types of backflow preventers usable with the invention. In FIG. 17, the backflow preventer 52*a* is of the anti-foam, anti-spray type described in connection with FIGS. 19–22 hereinbelow. In the backflow preventer-mixer combination 50 shown in FIG. 17 and in FIGS. 19–22, the water stream exits the venturi 54 in a collimated stream 200. In order for the venturi 54 to function adequately, this stream 200 needs to be slowed and dispersed toward the expanding walls 202 of the venturi outlet 203. This is achieved in the structure of FIG. 17 by the S-shape of the spout 28 and by the restrictor 204 inserted in the spout 28. The collimated stream 200 strikes the wall of spout 28 at 206, is deflected at an angle against the restrictor 204, and partially bounces back toward the venturi 54 to create a turbulence in the venturi outlet 203 that slows the collimated stream 200 and breaks it up sufficiently to start the chemical-drawing action of the venturi 54.

As shown in FIG. 17*a*, the restrictor 204 has a key-shaped cross-section. When the water is turned off and the bottle 130 (FIG. 13) is withdrawn, a significant amount of fluid is still present above the restrictor 204. The shank portion 208 of the key-shaped cross-section allows air to enter the space above the restrictor 204 so that this retained fluid can flow out immediately through the head portion 210 of the restrictor cross-section, rather than being momentarily retained and then spilled after the bottle 130 has been removed.

FIG. 18 shows the backflow preventer-mixer assembly 50 and spout 28 when used with a conventional air gap backflow preventer 52*b* which draws a curtain of air 211 down into the venturi outlet 203 around the water stream 212 exiting the venturi 54 and de-collimates it sufficiently to start the venturi action without the need for the restrictor 204.

Now, reference will be made to FIGS. 19–22, wherein a preferred embodiment of the backflow preventer-mixer combination 50 will be more fully described. As noted above, the device 50 comprises an air gap section (or flex gap section) 52 and a venturi section 54. Water from the municipal water supply enters the air gap section 52 through an inlet plenum 216 and flows into the interior of a barrel 218 that is sealed at its bottom end 220, but has lateral openings 222 near its upper end 224. The barrel 218 is surrounded by a cylindrical elastic sleeve 226 whose inner diameter is a little larger than the outer diameter of the upper and intermediate portions 228, 230 of the barrel 218, but smaller than the outer diameter of the bottom portion 232 of the barrel 218. The barrel 218 has an annular flange 234 at its top, and the sleeve 226 has a similar flange 236 at its top. When the air gap section 52 is assembled, the flange 236 is compressed between the flange 234 and the shoulder 238 at the top of the cage 240 (see FIG. 20). Air enters the cage 240 through the lateral slots 242, but water cannot spray outwardly through the slots 242 because the water is contained on the inside of the sleeve 226 throughout the length of the slots 242.

Below the air inlet slots 242, the air gap section 52 has an inwardly directed annular flange 244 which has an inner diameter slightly larger than the outer diameter of the sleeve at that point. This is the smallest outer diameter of the sleeve 226, because at that point it encircles the recessed portion 243 (FIG. 21) of the barrel 218 which is the smallest-diameter portion of the barrel 218.

Figures 19, 20:
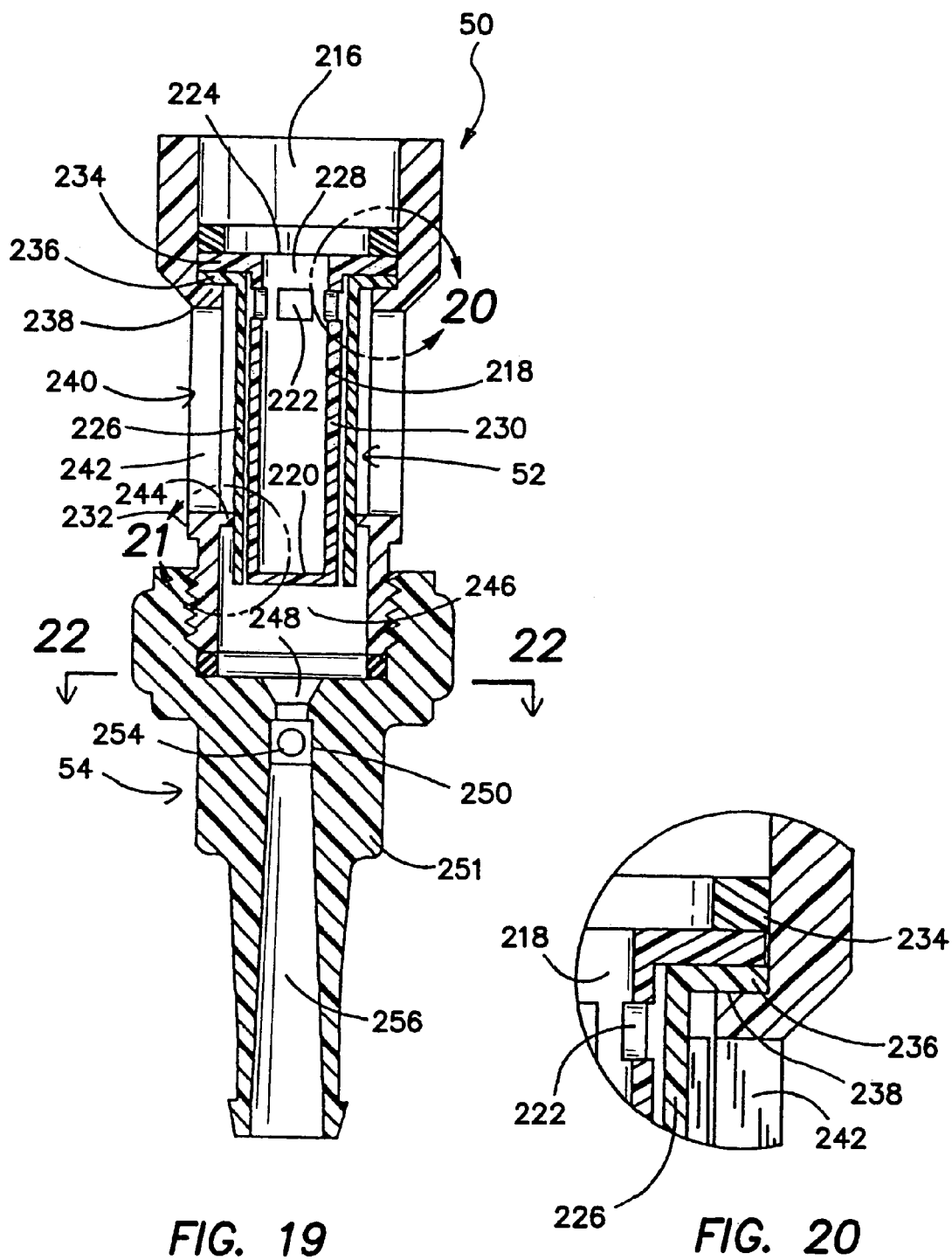
FIG. 19 is a vertical cross-section through a venturi and flex-gap combination of the present invention.
FIG. 20 is an enlarged detail cross-section of a portion of FIG. 19 labeled "See FIG. 20"

As is apparent to those skilled in the art, from the cross-hatchings in FIGS. 17 and 19, in particular, the venturi section 54 of the device 50 is constructed of molded plastic material. It is an integral structure, in contrast to prior art approaches wherein such venturi sections utilize separate insert elements to control the rate of fluid flow. Thus, in these prior art systems, when it is desired to change the flow rate of the venturi, it is necessary to change the insert. In the present system, in contrast, the entire integrally molded venturi is replaced—each venturi being designed specifically for a particular flow rate. The advantage of the inventive approach is that such an integrally molded venturi greatly reduces or eliminates foaming and bubbling problems inherent in the prior art systems, due to improperly fitting insert elements for regulating flow rate. Additionally, mere replacement of the entire venturi section 54, for the purpose of changing the rated flow rate of the system 50, is much easier and quicker than having to disassemble the system to change an insert, and ensuring that the new insert is properly fitted into the venturi shell.

Figure 21A:
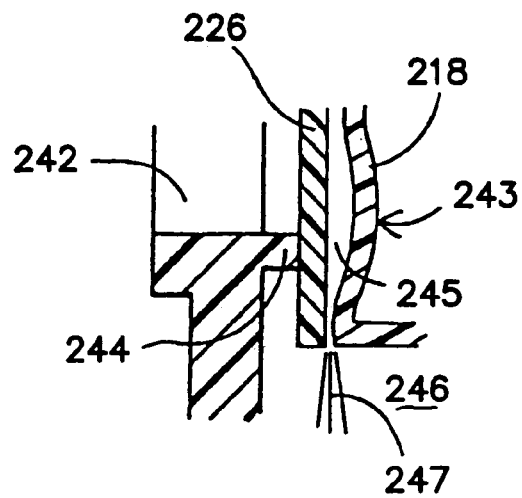
FIG. 21a is an enlarged detail cross-section of a portion of FIG. 19 labeled "See FIG. 21", illustrating the system when water is flowing.
Figure 21B:
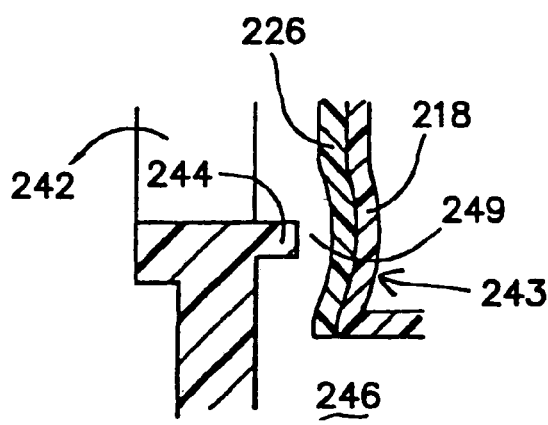
FIG. 21b is an enlarged detail cross-section of a portion of FIG. 19 labeled "See FIG. 21", illustrating the system when water is not flowing.
Figure 22:
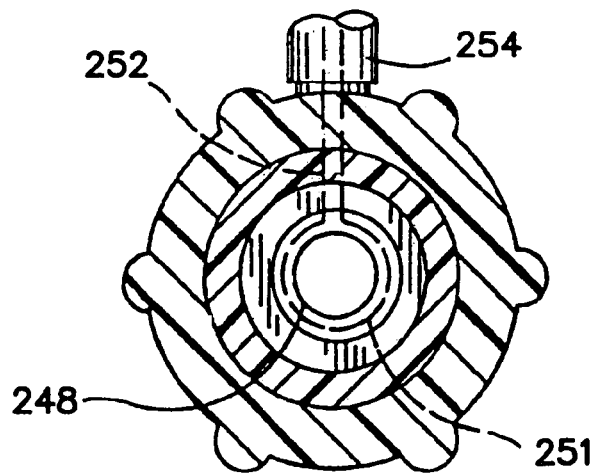
FIG. 22 is a horizontal cross-section taken along line 22—22 of FIG. 19.

When the water is turned on, it flows into the barrel 218 and fills it quickly. Additional water then exits through the lateral openings 222 in an essentially laminar flow into the space 245 between the barrel 218 and the sleeve 226. With water flowing into it, the sleeve 226 expands, and its outer surface eventually contacts the flange 244, sealing the plenum 246, and hence the venturi section 54, against the entry of any air from the slots 242 (FIG. 21*a*).

Thus, as long as water 247 flows toward the venturi section 54, that water is free of air. If a siphon action occurs in the municipal water line, the sleeve 226 is pulled tight against the outer surface of the barrel 218 (FIG. 21*a*). This seals off the barrel 218 and the water inlet, and at the same time opens the plenum 246 to the ambient air through the space 249 between the collapsed sleeve 226 and the flange 244.

In the venturi section 54, the water flows from the plenum 246 into the throat 248 of the venturi 250. A passage 252, to which a cannula 254 (FIG. 22) coming from a source (not shown) of liquid chemical is connected, enters the venturi 250 at 251 just below its throat 248, where the sucking action of the venturi 250 draws the chemical into the water stream and mixes it with the water.

The water/chemical mixture exits the venturi 250 as a coherent, air-free stream 200 (FIG. 17) which can fill a container such as a spray bottle 260 (FIG. 13) with a minimum of foaming. At the same time, no water can escape the inventive device other than through the venturi outlet 203, because as long as the water flows, the slots 222 are sealed off from the water stream.

It will be seen that the above-described invention provides an extremely versatile container filling apparatus that can be modularly adapted to a wide variety of functional requirements and installation conditions. Consequently, the invention is not to be understood as being limited by the described embodiments, but only by the scope of the following claims.

What is claimed is:

1. An anti-foam splash-proof nozzle for filling containers, comprising:
   an air gap section, said air gap section comprising:
      a hollow barrel having a water inlet and lateral openings;
      an elastic sleeve surrounding said barrel and forming therewith a resiliently openable seal, said sleeve, when said seal is opened, defining a water path between said barrel and said sleeve into said plenum while at the same time sealing said plenum against ambient air;
   a venturi section, said venturi section comprising:
      a venturi;
      a water inlet from said plenum to said venturi;
      a passage for conveying a foam-prone chemical into the throat of said venturi to mix it with water flowing through said venturi; and
      an outlet adapted to communicate with a container to be filled;
   wherein said venturi section is comprised of integrally molded plastic; and
   a plenum between said air gap section and said venturi section, said plenum being in communication with ambient air in the absence of water flow.

2. A method of filling containers with a mixture of water and chemicals, using an anti-foam nozzle, comprising:
   selecting a desired flow rate for said nozzle;
   selecting an integrally molded venturi section for producing the selected flow rate;
   inserting said integrally molded venturi section into said anti-foam nozzle,
   introducing water into said nozzle, such that it flows into a space between a barrel and a sleeve in said nozzle, thereby expanding the sleeve until it acts to seal said venturi section against entry of air thereinto;
   introducing a chemical into said venturi section, beneath a throat thereof, to draw the chemical into a water stream passing through said venturi section, thereby forming a fluid mixture; and
   discharging said fluid mixture into a desired container.

3. The method as recited in claim 2, wherein said venturi section is comprised of an integrally molded plastic.

4. The method as recited in claim 2, and further comprising:
   selecting a different desired flow rate for said nozzle;
   removing the integrally molded venturi section from said nozzle;
   selecting a differently sized integrally molded venturi section; and
   inserting said differently sized integrally molded venturi section into said nozzle.

* * * * *